(12) United States Patent
Chauvel et al.

(10) Patent No.: US 7,069,415 B2
(45) Date of Patent: Jun. 27, 2006

(54) SYSTEM AND METHOD TO AUTOMATICALLY STACK AND UNSTACK JAVA LOCAL VARIABLES

(75) Inventors: Gerard Chauvel, Antibes (FR); Maija Kuusela, Mouans-Sartoux (FR); Dominique D'Inverno, Villeneuve-Loubet (FR)

(73) Assignee: Texas Instruments Incorporated, Dallas, TX (US)

( * ) Notice: Subject to any disclaimer, the term of this patent is extended or adjusted under 35 U.S.C. 154(b) by 230 days.

(21) Appl. No.: 10/632,228

(22) Filed: Jul. 31, 2003

(65) Prior Publication Data

US 2004/0059893 A1 Mar. 25, 2004

Related U.S. Application Data

(60) Provisional application No. 60/400,391, filed on Jul. 31, 2002.

(30) Foreign Application Priority Data

Jul. 30, 2003 (EP) .................................. 03291905

(51) Int. Cl.
*G06F 12/02* (2006.01)
(52) U.S. Cl. ....................... 711/215; 711/118
(58) Field of Classification Search ................ 711/118, 711/3, 115, 215
See application file for complete search history.

(56) References Cited

U.S. PATENT DOCUMENTS

| 6,098,089 | A | 8/2000 | O'Connor et al. .......... 709/104 |
| 6,567,905 | B1 | 5/2003 | Otis ........................... 711/170 |
| 6,571,260 | B1 | 5/2003 | Morris ....................... 707/206 |
| 2002/0065990 | A1 | 5/2002 | Chauvel et al. ............. 711/137 |
| 2002/0069332 | A1 | 6/2002 | Chauvel et al. ............. 711/144 |
| 2003/0101320 | A1 | 5/2003 | Chauvel et al. ............. 711/154 |

OTHER PUBLICATIONS

*Embedded JAVA*, Vincent Perrier, Aug. 15, 2001, (3 p.); Online http://www.onjava.com/pub/a/onjava/synd/2001/08/15/embedded.html.

*Primary Examiner*—Hiep T. Nguyen
(74) *Attorney, Agent, or Firm*—Ronald O. Neerings; Wade James Brady; Frederick J. Telecky, Jr.

(57) ABSTRACT

A processor preferably comprises a processing core that generates memory addresses to access a memory and on which a plurality of methods operate, a cache coupled to the processing core, and a programmable register containing a pointer to a currently active method's set of local variables. The cache may be used to store one or more sets of local variables, each set being used by a method. Further, the cache may include at least two sets of local variables corresponding to different methods, one method calling the other method and the sets of local variables may be separated by a pointer to the set of local variables corresponding to the calling method.

15 Claims, 4 Drawing Sheets

| R0  | GENERAL PURPOSE (GP)                          |
|-----|-----------------------------------------------|
| R1  | GENERAL PURPOSE (GP)                          |
| R2  | GENERAL PURPOSE (GP)                          |
| R3  | GENERAL PURPOSE (GP)                          |
| R4  | PROGRAM COUNTER (PC)                          |
| R5  | GENERAL PURPOSE / LOCAL VARIABLE POINTER (LV) |
| R6  | STACK POINTER (SP)                            |
| R7  | TOP OF STACK (ToS)                            |
| R8  | GENERAL PURPOSE / ADDRESS INDEX 0 (AI0)       |
| R9  | GENERAL PURPOSE / ADDRESS INDEX 1 (AI1)       |
| R10 | GENERAL PURPOSE (GP)                          |
| R11 | GENERAL PURPOSE (GP)                          |
| R12 | MICRO-PROGRAM COUNTER (MICRO-PC)              |
| R13 | GENERAL PURPOSE (GP)                          |
| R14 | GENERAL PURPOSE / INDIRECT REGISTER INDEX (IRI) |
| R15 | STATUS AND CONTROL (ST)                       |

*FIG. 4*

FIG. 5 CREATES LOCAL VARIABLE FRAME ON INVOKE METHOD

FIG. 6 DESTROY LOCAL VARIABLE FRAME ON METHOD RETURN

SYSTEM AND METHOD TO AUTOMATICALLY STACK AND UNSTACK JAVA LOCAL VARIABLES

CROSS-REFERENCE TO RELATED APPLICATIONS

This application claims priority to U.S. Provisional Application Ser. No. 60/400,391 titled "JSM Protection," filed Jul. 31, 2002, incorporated herein by reference. This application also claims priority to EPO Application No. 03291905.2, filed Jul. 30, 2003 and entitled "System And Method To Automatically Stack And Unstack Java Local Variables," incorporated herein by reference. This application also may contain subject matter that may relate to the following commonly assigned co-pending applications incorporated herein by reference: "Memory Management Of Local Variables," Ser. No. 10/632,067, filed Jul. 31, 2003; "Memory Management Of Local Variables Upon A Change Of Context," Ser. No. 10/632,076, filed Jul. 31, 2003; "A Processor With A Split Stack," Ser. No. 10/632/079, filed Jul. 31, 2003; "Using IMPDEP2 For System Commands Related To Java. Accelerator Hardware," Ser. No. 10/632,069, filed Jul. 31, 2003; "Test With Immediate And Skip Processor Instruction," Ser. No. 10/632,214, filed Jul. 31, 2003; "Test And Skip Processor Instruction Having At Least One Register Operand," Ser. No. 10/632,084, filed Jul. 31, 2003; "Synchronizing Stack Storage," Ser. No. 10/631,422, filed Jul. 31, 2003; "Methods And Apparatuses For Managing Memory," Ser. No. 10/631/252, filed Jul. 31, 2003; "Write Back Policy For Memory," Ser. No. 10/631,185, filed Jul. 31, 2003; "Methods And Apparatuses For Managing Memory," Ser. No. 10/631,205, filed Jul. 31, 2003; "Mixed Stack-Based RISC Processor," Ser. No. 10/631,308, filed Jul. 31, 2003; "Processor That Accommodates Multiple Instruction Sets And Multiple Decode Modes," Ser. No. 10/631,246, filed Jul. 31, 2003; "System To Dispatch Several Instructions On Available Hardware Resources," Ser. No. 10/631,585, filed Jul. 31, 2003; "Micro-Sequence Execution In A Processor," Ser. No. 10/632,216, filed Jul. 31, 2003; "Program Counter Adjustment Based On The Detection Of An Instruction Prefix," Ser. No. 10/632,222, filed Jul. 31, 2003; "Reformat Logic To Translate Between A Virtual Address And A Compressed Physical Address," Ser. No. 10/632/215, filed Jul. 31, 2003; "Synchronization Of Processor States," Ser. No. 10/632,024, filed Jul. 31, 2003; "Conditional Garbage Based On Monitoring To Improve Real Time Performance," Ser. No. 10/631,195, filed Jul. 31, 2003; "Inter-Processor Control," Ser. No. 10/631,120, filed Jul. 31, 2003; "Cache Coherency In A Multi-Processor System," Ser. No. 10/631,229, filed Jul. 31, 2003; "Concurrent Task Execution In A Multi-Processor, Single Operating System Environment," Ser. No. 10/632,077, filed Jul. 31, 2003; and "A Multi-Processor Computing System Having A Java Stack Machine And A RISC-Based Processor," Ser. No. 10/631,939, filed Jul. 31, 2003;

BACKGROUND OF THE INVENTION

1. Technical Field of the Invention

The present invention relates generally to processors and more particularly to managing local variables used by a processor.

2. Background Information

Many types of electronic devices are battery operated and thus preferably consume as little power as possible. An example is a cellular telephone. Further, it may be desirable to implement various types of multimedia functionality in an electronic device such as a cell phone. Examples of multimedia functionality may include, without limitation, games, audio decoders, digital cameras, etc. It is thus desirable to implement such functionality in an electronic device in a way that, all else being equal, is fast, consumes as little power as possible and requires as little memory as possible. Improvements in this area are desirable.

BRIEF SUMMARY

In some embodiments, a processor preferably comprises a processing core that generates memory addresses to access a memory and on which a plurality of methods operate, a cache coupled to the processing core, and a programmable register containing a pointer to a currently active method's set of local variables. The cache may be used to store one or more sets of local variables, each set being used by a method. Further, the cache may include at least two sets of local variables corresponding to different methods, one method calling the other method and the sets of local variables may be separated by a pointer to the set of local variables corresponding to the calling method.

NOTATION AND NOMENCLATURE

Certain terms are used throughout the following description and claims to refer to particular system components. As one skilled in the art will appreciate, semiconductor companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a more detailed description of the preferred embodiments of the present invention, reference will now be made to the accompanying drawings, wherein.

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

The subject matter disclosed herein is directed to a programmable electronic device such as a processor having memory in which "local variables" associated with a stack-based language (e.g., Java) and pointers associated with the local variables may be stored. The term "local variables" refers to temporary variables used by a method that executes on the processor. Multiple methods may run on the processor and each method preferably has its own set of local variables. In general, local variables have meaning only while their associated method is running. The stack-based language may comprise Java Bytecodes although this disclosure is not so limited. In Java Bytecodes, the notion of local variables ("LVs") is equivalent to automatic variables in other programming languages (e.g., "C") and other named variables in still other programming languages.

The following describes the operation of a preferred embodiment of such a processor in which the methods and local variables may run and be used. Other processor architectures and embodiments may be used and thus this disclosure and the claims which follow are not limited to any particular type of processor. Details regarding the storage of the local variables and the associated pointers follow the description of the processor.

The processor described herein is particularly suited for executing Java™ Bytecodes, or comparable code. As is well known, Java is particularly suited for embedded applications. Java is a relatively "dense" language meaning that on average each instruction may perform a large number of functions compared to various other programming languages. The dense nature of Java is of particular benefit for portable, battery-operated devices that preferably include as little memory as possible to save space and power. The reason, however, for executing-Java code is not material to this disclosure or the claims that follow.

Figure 1:
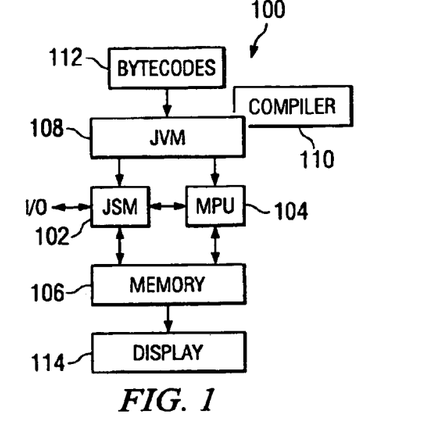
FIG. 1 shows a diagram of a system in accordance with preferred embodiments of the invention and including a Java Stack Machine ("JSM") and a Main Processor Unit ("MPU")
Figure 2:
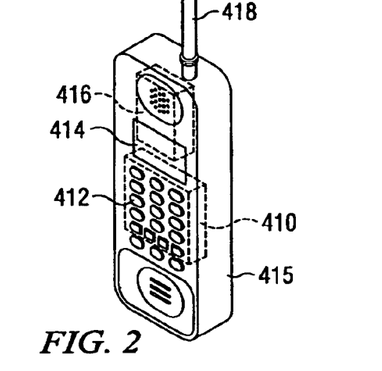
FIG. 2 depicts an exemplary embodiment of the system described herein in the form of a communication device (e.g., cellular telephone)

Referring now to FIG. 1, a system 100 is shown in accordance with a preferred embodiment of the invention. As shown, the system includes at least two processors 102 and 104. Processor 102 is referred to for purposes of this disclosure as a Java Stack Machine ("JSM") and processor 104 may be referred to as a Main Processor Unit ("MPU"). System 100 may also include memory 106 coupled to both the JSM 102 and MPU 104 and thus accessible by both processors. At least a portion of the memory 106 may be shared by both processors meaning that both processors may access the same shared memory locations. Further, if desired, a portion of the memory 106 may be designated as private to one processor or the other. System 100 also includes a Java Virtual Machine ("JVM") 108, compiler 110, and a display 114. The JSM 102 preferably includes an interface to one or more input/output ("I/O") devices such as a keypad to permit a user to control various aspects of the system 100. In addition, data streams may be received from the I/O space into the JSM 102 to be processed by the JSM 102. Other components (not specifically shown) may include, without limitation, a battery and an analog transceiver to permit wireless communications with other devices. As such, while system 100 may be representative of, or adapted to, a wide variety of electronic systems, an exemplary electronic system may comprise a battery-operated, mobile cell phone such as that shown in FIG. 2. As shown in FIG. 2, a mobile communications device includes an integrated keypad 412 and display 414. The JSM 102 and MPU 104 noted above and other components may be included in electronics package 410 which may be coupled-to keypad 410, display 414, and radio frequency ("RF") circuitry 416 which may be connected to an antenna 418.

Referring again to FIG. 1, as is generally well known, Java code comprises a plurality of "Bytecodes" 112. Bytecodes 112 may be provided to the JVM 108, compiled by compiler 110 and provided to the JSM 102 and/or MPU 104 for execution therein. In accordance with a preferred embodiment of the invention, the JSM 102 may execute at least some, and generally most, of the Java Bytecodes. When appropriate, however, the JSM 102 may request the MPU 104 to execute one or more Java Bytecodes not executed or executable by the JSM 102. In addition to executing Java Bytecodes, the MPU 104 also may execute non-Java instructions. The MPU 104 also hosts an operating system ("O/S") (not specifically shown), which performs various functions including system memory management, the system task management that schedules the JVM 108 and most or all other native tasks running on the system, management of the display 114, receiving input from input devices, etc. Without limitation, Java code may be used to perform any one of a variety of applications including multimedia, games or web based applications in the system 100, while non-Java code, which may comprise the O/S and other native applications, may still run on the system on the MPU 104.

The JVM 108 generally comprises a combination of software and hardware. The software may include the compiler 110 and the hardware may include the JSM 102. The JVM may include a class loader, bytecode verifier, garbage collector, and a bytecode interpreter loop to interpret the bytecodes that are not executed on the JSM processor 102.

In accordance with preferred embodiments of the invention, the JSM 102 may execute at least two instruction sets. One instruction set may comprise standard Java bytecodes. As is well-known, Java is a stack-based programming language in which instructions generally target a stack. For example, an integer add ("IADD") Java instruction pops two integers off the top of the stack, adds them together, and pushes the sum back on the stack. As will be explained in more detail below, the JSM 102 comprises a stack-based architecture with various features that accelerate the execution of stack-based Java code.

Another instruction set executed by the JSM 102 may include instructions other than standard Java instructions. In accordance with at least some embodiments of the invention, such other instruction set may include register-based and memory-based operations to be performed. This other instruction set generally complements the Java instruction set and, accordingly, may be referred to as a complementary instruction set architecture ("C-ISA"). By complementary, it is meant that the execution of more complex Java Bytecodes may be substituted by micro-seqeunces using C-ISA instructions that permit address calculation to readily "walk through" the JVM data structures. Further, such micro-sequences may also use Bytecode instructions. The execution of Java may be made more efficient and run faster by replacing some sequences of Bytecodes by preferably shorter and more efficient sequences of C-ISA instructions. Bytecodes may also be used within a C-ISA sequence. The two sets of instructions may be used in a complementary fashion to obtain satisfactory code density and efficiency. As such, the JSM 102 generally comprises a stack-based architecture for efficient and accelerated execution of Java bytecodes combined with a register-based architecture for executing register and memory based C-ISA instructions. Both architectures preferably are tightly combined and integrated through the C-ISA.

Figure 3:
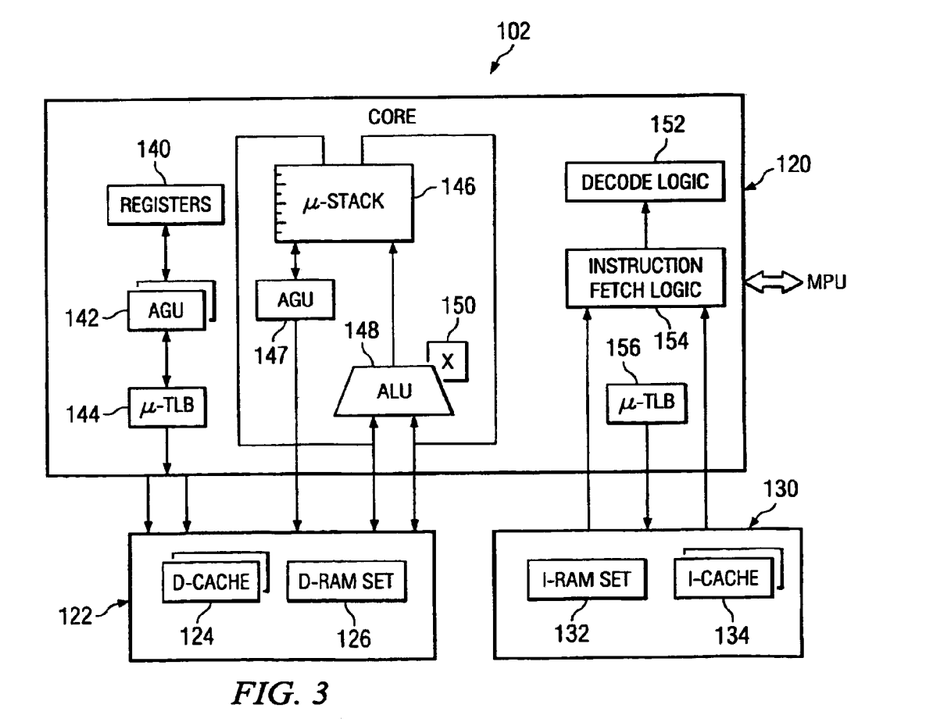
FIG. 3 shows a block diagram of the JSM of FIG. 1 in accordance with a preferred embodiment of the invention.

FIG. 3 shows an exemplary block diagram of the JSM 102. As shown, the JSM includes a core 120 coupled to data storage 122 and instruction storage 130. The core may include one or more components as shown. Such components preferably include a plurality of registers 140, three address generation units ("AGUs") 142, 147, micro-translation lookaside buffers (micro-TLBs) 144, 156, a multi-entry micro-stack 146, an arithmetic logic unit ("ALU") 148, a multiplier 150, decode logic 152, and instruction fetch logic 154. In general, operands may be retrieved from data storage 122 or from the micro-stack 146, processed by the ALU 148, while instructions may be fetched from instruction storage 130 by fetch logic 154 and decoded by decode logic 152. The address generation unit 142 may be used to calculate addresses based, at least in part on data contained in the registers 140. The AGUs 142 may calculate addresses for C-ISA instructions as will be described below. The AGUs 142 may support parallel data accesses for C-ISA instructions that perform array or other types of processing. AGU 147 couples to the micro-stack 146 and may manage overflow and underflow conditions in the micro-stack preferably in parallel. The micro-TLBs 144, 156 generally perform the function of a cache for the address translation and memory protection information bits that are preferably under the control of the operating system running on the MPU 104.

Figure 4:
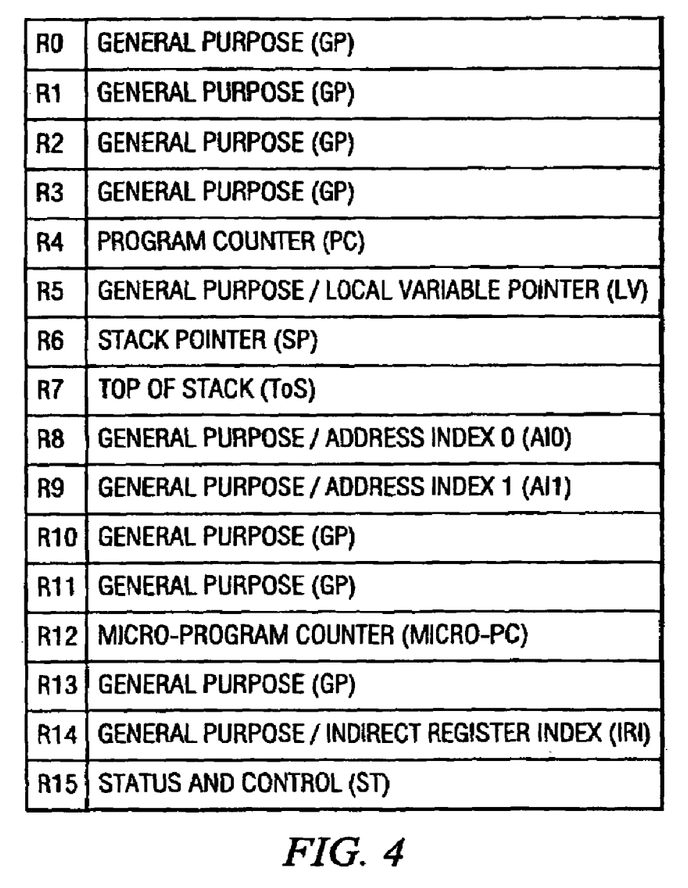
FIG. 4 shows various registers used in the JSM of FIGS. 1 and 3.

Referring now to FIG. 4, the registers 140 may include 16 registers designated as R0–R15. Registers R0–R3, R5, R8–R11 and R13–R14 may be used as general purposes ("GP") registers usable for any purpose by the programmer. Other registers, and some of the GP registers, may be used for specific functions. For example, registers R4 and R12 may be used to store two program counters. Register R4 preferably is used to store the program counter ("PC") and register R12 preferably is used to store a micro-program counter ("micro-PC"). In addition to use as a GP register, register R5 may be used to store the base address of a portion of memory in which Java local variables may be stored when used by the currently executing Java method. The top of the micro-stack 146 may be referenced by the values in registers R6 and R7. The top of the micro-stack has a matching address in external memory pointed to by register R6. The values contained in the micro-stack are the latest updated values, while their corresponding values in external memory may or may not be up to date. Register R7 provides the data value stored at the top of the micro-stack. Registers R8 and R9 may also be used to hold the address index 0 ("AI0") and address index 1 ("AI1"), as will be explained below. Register R14 may also be used to hold the indirect register index ("IRI"). Register R15 may be used for status and control of the JSM 102.

Referring again to FIG. 3, as noted above, the JSM 102 is adapted to process and execute instructions from at least two instruction sets and one or more methods comprising such instructions. One instruction set includes stack-based operations and the second instruction set includes register-based and memory-based operations. The stack-based instruction set may include Java Bytecodes. Java Bytecodes pop, unless empty, data from and push data onto the micro-stack 146. The micro-stack 146 preferably comprises the top n entries of a larger stack that is implemented in data storage 122. Although the value of n may be vary in different embodiments, in accordance with at least some embodiments, the size n of the micro-stack may be the top eight entries in the larger, memory-based stack. The micro-stack 146 preferably comprises a plurality of gates in the core 120 of the JSM 102. By implementing the micro-stack 146 in gates (e.g., registers) in the core 120 of the processor 102, access to the data contained in the micro-stack 146 is generally very fast, although any particular access speed is not a limitation on this disclosure. The second register-based, memory-based instruction set may comprise the C-ISA instruction set introduced above. The C-ISA instruction set preferably is complementary to the Java bytecode instruction set in that the C-ISA instructions may be used to accelerate or otherwise enhance the execution of Java Bytecodes.

The ALU 148 adds, subtracts, and shifts data. The multiplier 150 may be used to multiply two values together in one or more cycles. The instruction fetch logic 154 generally fetches instructions from instruction storage 130. The instructions may be decoded by decode logic 152. Because the JSM 102 is adapted to process instructions from at least two instruction sets, the decode logic 152 generally comprises at least two modes of operation, one mode for each instruction set. As such, the decode logic unit 152 may include a Java mode in which Java instructions may be decoded and a C-ISA mode in which C-ISA instructions may be decoded.

The data storage 122 generally comprises data cache ("D-cache") 124 and a data random access memory ("D-RAMset") 126. Reference may be made to copending applications U.S. Ser. Nos. 09/591,537 filed Jun. 9, 2000 , 09/591,656 filed Jun. 9, 2000, and 09/932,794 filed Aug. 17, 2001, all of which are incorporated herein by reference. The stack (excluding the micro-stack 146), arrays and non-critical data may be stored in the D-cache 124, while Java local variables and associated pointers as explained below, as well as critical data and non-Java variables (e.g., C, C++) may be stored in D-RAMset 126. The instruction storage 130 may comprise instruction RAM ("I-RAMset") 132 and instruction cache ("I-cache") 134. The I-RAMset 132 may be used to store "complex" micro-sequenced Bytecodes or micro-sequences or predetermined sequences of code. The I-cache 134 may be used to store other types of Java Bytecode and mixed Java/C-ISA instructions.

In accordance with a preferred embodiment of the invention, at least some applications executed by the JSM 102 comprise one or more methods. A "method" includes executable instructions and performs one or more functions. Other terms for "method" may include subroutines, code segments, and functions, and the term should not be used to narrow the scope of this disclosure.

Figure 5:
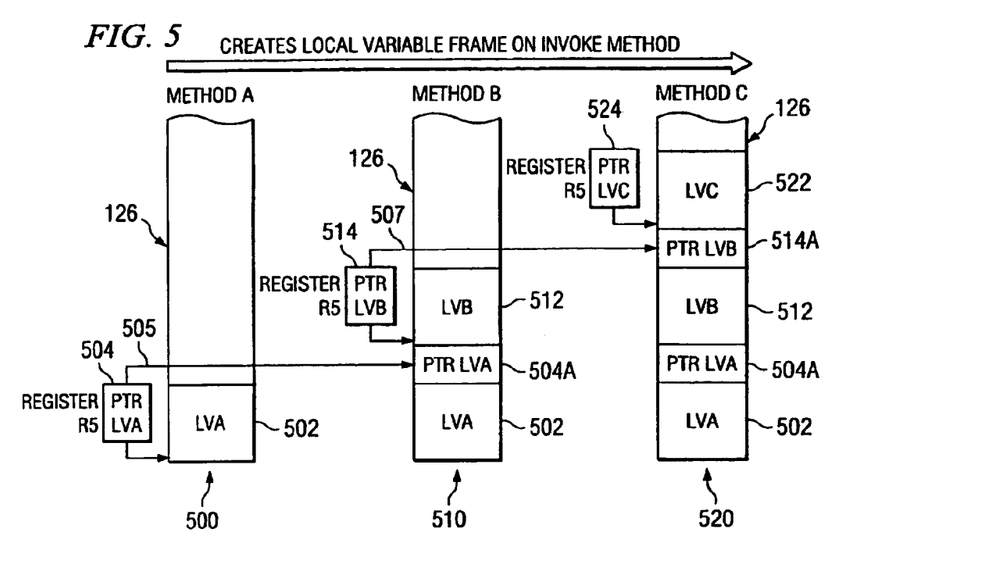
FIG. 5 illustrates the storage of local variables and pointers in accordance with the preferred embodiments.

A method (the "calling" method) may call another method (the "called" method). Once the called method performs its function, program control returns to the calling method. Multiple hierarchical levels of methods are possible as illustrated in FIG. 5 which illustrates the interaction between three methods (Method A, Method B, and Method C). For purposes of the example of FIG. 5, method A calls method B and method B calls method C. As such, method A is the calling method for method B which is the called method relative to method A and only while method A is executing.

Similarly, method B is the calling method relative to method C which is considered the called method relative to method B.

A method may have one or more "local variables," as explained previously. Local variables may be used to temporarily store data or other information as the method performs its task(s). The local variables preferably are specific to the method to which the variables pertain. That is, method A's local variables ("LVA") are accessible generally by only method A and have meaning only to method A. That is, once method A completes, the method A local variables become meaningless. Similarly, LVB and LVC comprise local variables associated with methods B and C, respectively. Java Bytecodes refer to local variables using an index. The Java machine JVM maintains a local variables pointer ("PTR LV") which points to the base address of the memory containing the current method's local variables. To access a particular local variable, a suitable index value is added to the base address to obtain the address of the desired local variable.

FIG. 5 generally shows the state of the D-RAMset 126 in accordance with a time sequence of events 500, 510, and 520 as each method B and C is invoked. In sequence 500, method A is invoked and storage space 502 is allocated for its local variables (LVA). A base pointer (PTR LVA) 504 also is determined or selected to point to the base portion of LVA storage space 502. Using the pointer PTR LVA, references may be made to any local variable with method A's local variable set 502 by computing an index or offset to the PTR LVA value.

Although a plurality of methods may run on the JSM 102, typically only one method is "active" at a time having its instructions actively being executed by the JSM 102. The base pointer of the currently active method preferably is stored in register R5 as noted previously. In general, the base pointer for the active method may be computed by the JVM 108 while executing the invoke bytecode of the active method. This bytecode is a complex bytecode executed by a micro-sequence or by the JVM.

Sequence 510 depicts the state of the D-RAMset 126 when method A calls method B. In accordance with the preferred embodiments of the invention, the local variables (LVB) associated with method B are stacked in storage space 512 generally adjacent LVA ("on top of" LVA when viewed as in FIG. 5). Following arrow 505, the base pointer for LVA (PTR LVA) preferably is also stored in the D-RAMset 126 adjacent (e.g., below) the LVB data at location 504A. Thus, the two local variable sets LVA and LVB may be separated by the base pointer (PTR LVA) for LVA and possibly other data. Once the base pointer 504 for LVA is stored adjacent (below) the reserved space for the LVB data set 502, register R5 is updated (i.e., loaded) with a base pointer 514 for use with the LVB data set.

The JSM 102 may load LVA's base pointer 504 into location 504A by executing a store instruction to store LVA's base pointer at location 504A. Location 504A may be determined as the location pointed to by the base pointer of LVB (PTR LVB) minus 1. That is, the set of local variables associated with method B is mapped adjacent the pointer associated with method A's local variables. The value of PTR LVB may be determined as the sum of the value for PTR LVA 504, the size of LVA 502, and a value p. The value p may be an integer that is appropriate to take into account the size of the pointer itself and thus may be more than 4 bytes. Other data may be present between the storage areas for LVA 502 and LVB 512.

Following arrow 507 to time sequence 520, when method C is invoked (called by method B), the base pointer for method B (PTR LVB) is stored in location 514A which may be on top of LVB and below PTR LVC as shown and register R5 is loaded with the base pointer 524 (PTR LVC) to the base of the LVC data set 522. Method C's local variables (LVC) are allocated to storage space 522 which generally is adjacent (on top of) LVB 512 and PTR LVB 514A as shown. The PTR LVB value is stored in location 514A according to a similar calculation as that described above.

Figure 6:
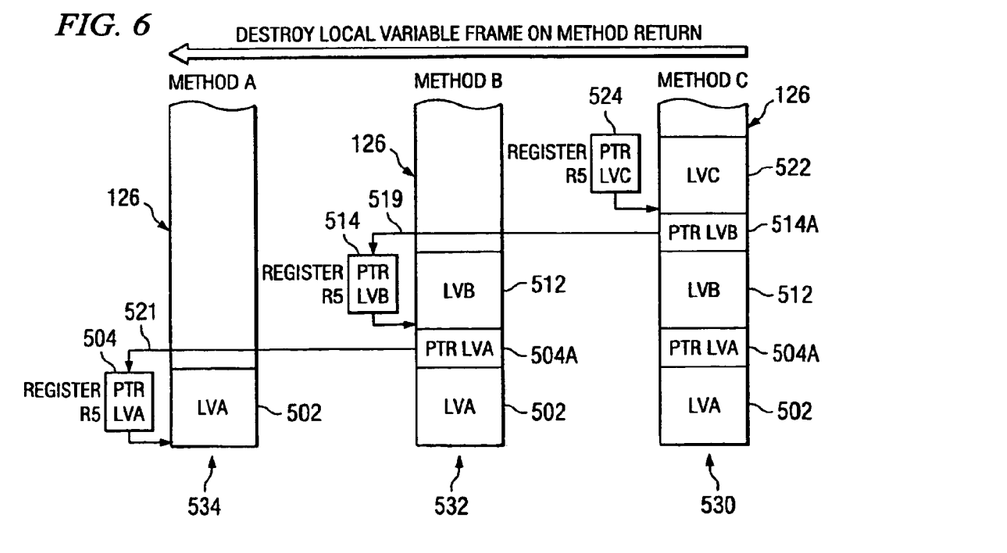
FIG. 6 illustrates the use of the local variable pointers upon returning from a method.

FIG. 6 illustrates the return process as each method (Methods C and then B) completes and returns to its calling method (methods B and then A). Beginning with time sequence 530 in which the local variable frame comprises LVA, LVB, and LVC along with pointers PTR LVA and PTR LVB for LVA and LVB, method C completes. Control returns to method B and LVB's base pointer is loaded from location 514A into register R5 as shown by arrow 519 at time sequence 532 by accessing PTR LVB through a load instruction that include a fixed offset from PTR LVC as a target address. Then, when method B completes, LVA's pointer (PTR LVA) is loaded into register R5 from location 504A as illustrated by arrow 521 at time sequence 534. The base pointers may be retrieved from their locations in data cache 126 by loading the value located at the location pointed by the currently active method's base pointer minus an offset (e.g., 1).

In accordance with a preferred embodiment of the invention, the local variables (LVA-LVC) and associated pointers (PTR LVA-PTR LVC) may be stored in D-RAMset 126. The D-RAMset 126 may be implemented in accordance with the preferred embodiment described below and in copending applications entitled "Cache with multiple fill modes," filed Jun. 9, 2000, Ser. No. 09/591,656; "Smart cache," filed Jun. 9, 2000, Ser. No. 09/591,537; and publication No. 2002/0065990, all of which are incorporated herein by reference. As one of ordinary skill in the art can understand, combining the local variables of the called method and the pointer of the calling method in the adjacent memory location provides flexibility for the mapping of those blocks. Preferably, these data structures are stacked and mapped onto a D-RAMset due to their temporal properties. However, one of called method local variable or calling method pointer may be mapped onto memory accessed through the standard data cache described below with regard to FIG. 7 without changing the algorithm managing the local variable space on the invoke and return Bytecodes to create or return from a method. Using the standard data caches may be desirable, for example, if the amount of local variables for a method is too large to fit into the RAMset.

As described in greater detail below, in the preferred embodiment, the data storage 122 (FIG. 3) preferably comprises a 3-way cache with at least one cache way comprising D-RAMset 126. The D-RAMset (or simply "RAMset") cache 126 may be used to cache a contiguous block of memory (e.g., local variables and pointers as described above) starting from a main memory address location. The other two cache ways 124 may be configured as RAMset cache memories, or use another architecture as desired. For example, the data storage 122 may be configured as one RAMset cache 126 and a 2-way set associative cache 124. As such, the data storage 122 generally comprises one or more forms of cache memory. The instruction storage 130 may be similarly configured if desired.

In operation, the processor's core 102 may access main memory 106 (FIG. 1) within a given address space. If the information at a requested address in main memory 106 is also stored in the data storage 122, the data is retrieved from the data cache 124, 126. If the requested information is not stored in data cache, the data may be retrieved from the main memory 106 and the data cache 124, 126 may be updated with the retrieved data.

Figures 7, 8:
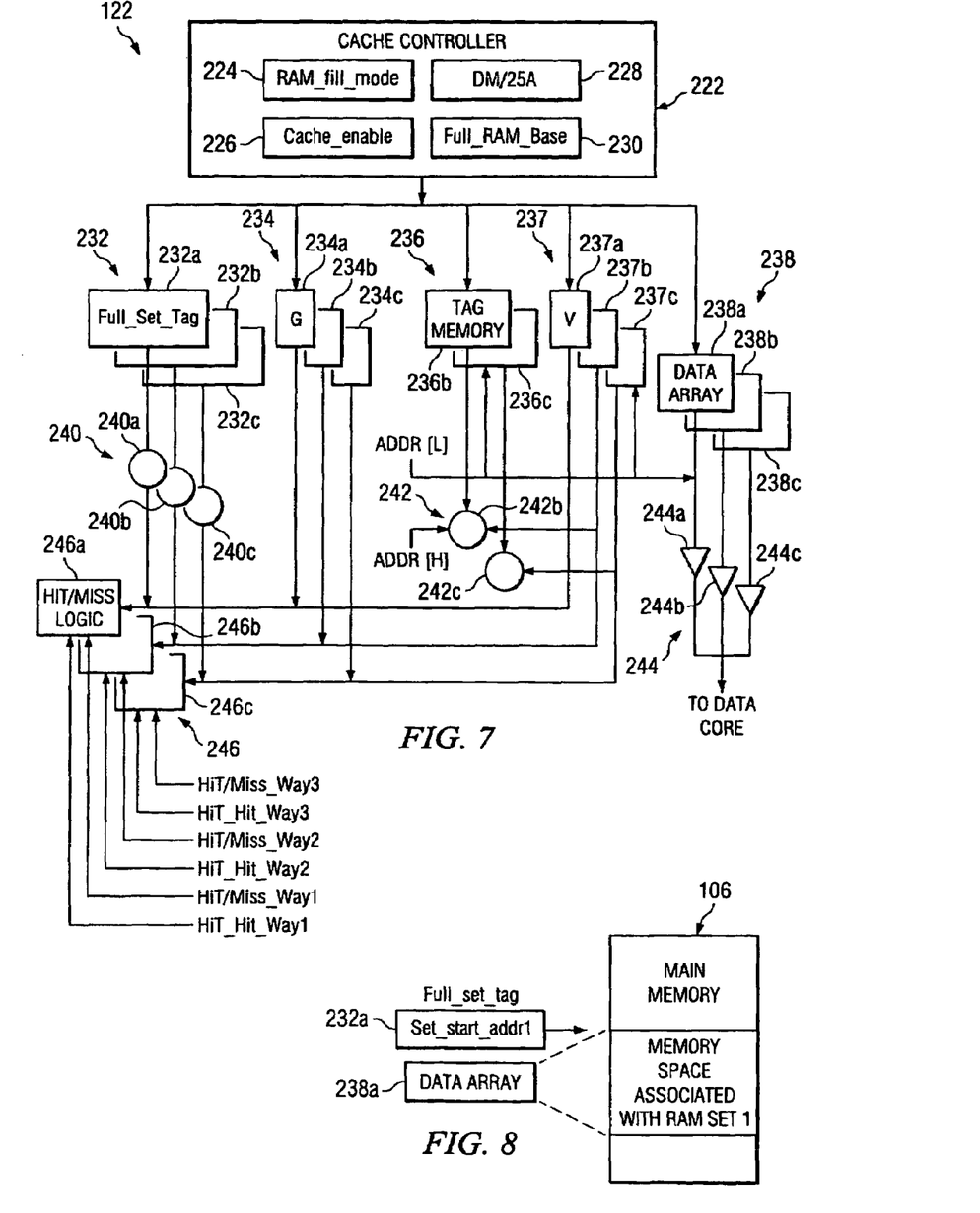
FIG. 7 illustrates a preferred embodiment of cache-based data storage in the JSM of FIG. 3.
FIG. 8 illustrates the mapping of the cache's data array to main memory.

FIG. 7 illustrates a more detailed block diagram of the data storage 122 in accordance with a preferred embodiment with a RAMset cache and a two-way set associative cache. A cache controller 222 may control operation of the data storage 122. Cache controller 222 may include a plurality of status bits including, without limitation, the following four status bits: RAM_fill_mode 224, Cache_Enable 226, DM/2SA 228 and Full_RAM_base 230 as well as other bits that are not specifically shown in FIG. 7. The two-way associative cache may be configured as a direct map and its other way configured as a RAMset. Alternatively, the two, two-way set associative cache may be configured as two additional RAMsets depending on cache control bit DM/2SA 238 and FULL_RAM_Set_base 230 as described in at least one of the documents incorporated herein by reference. However, the preferred configuration comprises a single RAMset coupled to a standard data cache. The RAMset is not limited in size, nor must the RAMset have the same size as the other cache way. Therefore, if another RAMset is needed for capacity reasons, a single RAMset with a bigger size may be preferred.

As shown, cache controller 222 couples to Full_Set_Tag registers 232 (individually referenced as registers 232a through 232c), Global_Valid bits 234 (individually referenced as bits 234a through 234c), tag memories 236 (individually referenced as tag memories 236b and 236c), valid entry bit arrays 237 (individually referenced as bit arrays 237a through 237c) and data arrays 238 (individually referenced as data arrays 238a through 238c). Comparators 240 (individually referenced as comparators 240a through 240c) may couple to respective Full_Set_Tag registers 232. Comparators 242 (individually referenced as comparators 242b and 242c) couple to respective tag memories 236. Output buffers 244 (individually referenced as buffers 244a through 244c) may couple to respective data arrays 238. Hit/Miss logic 246 (individually referenced as logic 246a through 246c) may couple to comparators 240, global valid bits 234, valid bits 237, RAM_fill_mode bit 224 and Cache_Enable bit 226.

In operation, data storage 122 may be configured using the control bits 224, 226, 228 and 230. The Cache_Enable 226 allows the data storage to be enabled or disabled, as in standard cache architecture. If the data storage 122 is disabled (e.g., Cache Enable=0), data read accesses may be performed on the main memory 106 without using the data storage 122. If the data storage 122 is enabled (e.g., Cache_Enable=1), data may he accessed in the data storage 122, in cases where such data is present in the data storage. If a miss occurs, a line (e.g., 16 bytes) may be fetched from main memory 106 and provided to the core 120.

The size of the data array 238a may be different than the size of the data arrays 238b, c for the other ways of the cache. For illustration purposes and without limiting this disclosure in any way, it will be assumed that data arrays 238b and 238c are each 8 Kbytes in size, configured as 512 lines, with each line holding eight two-byte data values. Data array 238a may be 16 Kbytes in size, configured as 1024 lines, each line holding eight, two byte data values. The ADDR[L] signals may be used to address one line of the data array 238 and valid bit array 237 (and tag memory 236, where applicable). Accordingly, for the 1024-line first way, ADDR[L] may include 10 bits [13:4] of an address from the core. For the 512-line second and third ways, ADDR[L] may include 9 bits [12:4] of an address from the core. The ADDR[H] signals define which set is mapped to a line. Thus, assuming a 4 Gbyte address space, ADDR[H] uses bits [31:14] of an address from the core for the first way and uses bits [31:13] for each of the second and third ways of the cache 130.

The tag memories 236 and comparators 242 may be used for a 2-way set associative cache (e.g., D-cache 124 in FIG. 3). When the core 120 performs a memory access, the tag memories 236 are accessed at the low order bits of the address (ADDR[L]). The tag memory locations store the high order address bits of the main memory address of the information stored in a corresponding line of the data array 238. These high order address bits may be compared with the high order address bits (ADDR[H]) of the address from the core 120. If the ADDR[H] matches the contents of the tag memory at ADDR[L], a hit occurs if the valid bit associated with the low order bits indicates that the cache entry is valid. If a cache hit occurs, the data from the corresponding data array 238 at ADDR[L] may be provided to the core 120 by enabling the corresponding output buffer 244. As described below, data from the 2-way cache is presented to the core 120 if there is a miss in the RAMset cache. By itself, the operation of the 2-way set associative cache and the direct map cache may be conventional and may not be affected by the RAMset cache 126. Other cache techniques could also be used in place of the 2-way cache 124.

The RAMset cache 126 preferably stores a contiguous block of main memory 106 starting at an address defined by the Full_set_tag register 232 for the RAMset. This contiguous block of information (e.g., local variables/pointers) may be mapped to the corresponding data array 238 of the RAMset. In at least some embodiments, only the high order bits of the starting address are stored in the Full_set_tag register 232. FIG. 8 illustrates this mapping for a single RAMset. As shown, the contents of Full_set_tag register 232a define the starting address for a contiguous block of memory cached in data array 238a.

Referring again to FIG. 7, a RAMset miss may occur when the high order bits of the address from the core 120 do not match the contents of the Full_set_TAG register 232 or the global valid bit is "0". In either case, when a RAMset miss occurs, the data storage 122 may behave like conventional, 2-way cache logic. As such, if there is a hit in the 2-way associative cache, then data is presented to the core 120 from the 2-way set associative cache. Otherwise, the data is retrieved from main memory 106, forwarded to the core and loaded into a "victim" entry of the two-way associative cache.

A RAMset hit situation may occur when the high order bits of the address from the core 120 match the contents of the Full_set_TAG register 232 and the global valid bit equals "1" (the setting of the global valid bit is described in greater detail below). By default, the RAMset comparison preferably has higher priority than the other cache ways. A hit situation indicates that the requested data is mapped into the RAMset. If the Valid entry bit 237 corresponding to the line containing the data is set to "1", comparator 240 causes hit/miss logic 246 to generate a "hit-hit" signal because the address hit the RAMset and the data is present in the RAM set. If the corresponding valid bit of the RAMset entry 237 is "0", logic 240 generates a "hit-miss" because the address hit the RAM set, but the data is not yet present in the RAM set. In this latter case, the data may be fetched from main memory 106 and loaded into the data array 238 of the RAMset. A hit in the RAMset logic takes precedence over the normal cache logic. The standard logic of the 2-way cache generates a miss when the RAMset logic generates a hit. Information can reside in both the RAMset and the 2-way cache without causing any misbehavior; the duplicated cache entry in the 2-way cache will eventually be evicted by the replacement mechanism of the two-way cache because such data will not be used. When configured as a RAMset, data array 238*a,b,c* can be configured as a local RAM or as a cached segment depending on the setting of a suitable configuration bit. However, even when configured as a local RAM, individual valid bits may be updated and misses do not generate accesses to the external memory.

To configure a RAMset for operation, the Full_set_tag register 232 preferably is loaded with a start address (set_start_addr) and the RAM_fill_mode bit 224 is configured to a desired fill mode. The circuitry for filling the cache can be the same as that used to fill lines of the set associative cache. At least one fill mode may be implemented and is referred to as a "line-by-line" fill mode as described below. Other fill modes may be implemented if desired such as the "set fill" mode described in at least one of the documents incorporated by reference.

For the line-by-line fill (RAM_fill_mode=0), the global valid bit 34 is set to "1" and the valid entry bits 237 are set to "0" when the Full_set_tag register 232 is loaded with the starting address. At this point, the data array 238 is empty (it is assumed that the Cache_Enable bit 226 is set to "1" to allow operation of the data storage 122). Upon receiving an address from the core 120, a valid entry bit 237 is selected based on the low order bits of the address. As provided above, if the RAMset is 16 Kbytes in size, organized as an array of 1K×16 bytes, where 16 bytes is equivalent to a block line in the associated 2-way cache, the Full_set_TAG register 232 may store 18 bits [31:14] of the starting address (set_start_addr). The address indexing each entry of the RAMset (ADDR[L]) may have 10 bits [13:4] and the data address, used to access one data value in the line, may have 3 bits [3:1] (assuming data accesses are 2 bytes). A line of the data array 238 (at ADDR[L]) is loaded from main memory 106 each time that a hit-miss situation occurs because (1) the comparator 240 determines a match between ADDR[H] and Set_start_addr, (2) the Global valid bit 34 is set to "1" and (3) the valid bit 237 associated with the line at ADDR[L] is "0". This situation indicates that the selected line is mapped to the RAMset, but has not yet been loaded into the RAMset's data array 238. When the line is loaded into the data array 238 from main memory 106, the valid bit 237 corresponding to the line is set to "1". This loading procedure has the same time penalty as a normal cache line load, but the entry will stay in the RAMset like a locked entry and, therefore, the processing device will not be penalized on a subsequent access.

The contents of a RAMset can be changed simply by writing a new Set_start_addr into the Full_set_tag register 232. Writing to this register flushes the contents of the respective set and initiates a load process. The control circuitry 222 can use the same circuitry for flushing lines of the RAMset cache as is used for the set associative cache. Flushing an entire RAMset cache may be accomplished simply by writing to the appropriate Full_set_tag register 232. Similarly, the control circuitry 222 can use the same circuitry for filling lines of the RAMset cache as is used for the set associative cache.

While the preferred embodiments of the present invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above. Each and every claim is incorporated into the specification as an embodiment of the present invention.

What is claimed is:

1. A processor, comprising:
   a processing core that generates memory addresses to access a memory and on which a plurality of methods operate;
   a cache coupled to said processing core, said cache used to store sets of local variables, each set being used by a method; and
   a programmable register containing a pointer to a currently active method's set of local variable;
   wherein said cache includes at least two sets of local variables corresponding to different methods including a calling method that calls a called method, wherein the set of local variables corresponding to the called method is mapped adjacent a pointer to the set of local variables corresponding to the calling method.

2. The processor of claim 1 further including two or more sets of local variables corresponding to two or more nested methods, each set of local variables corresponding to a calling method separated from the set of local variables corresponding to a called method by a pointer to the set of local variables corresponding to the calling method.

3. The processor of claim 1 further including three or more sets of local variables corresponding to three or more nested methods, each set of local variables corresponding to a calling method separated from the set of local variables corresponding to a called method by a pointer to the set of local variables corresponding to the calling method.

4. The processor of claim 1 wherein, upon completion of a method, the pointer to the local variables associated with the calling method is retrieved by the processing core subtracting an offset value from the pointer associated with the called method to compute a modified pointer value and retrieving the value from the cache at the location pointed by the modified pointer value.

5. The processor of claim 1 wherein the pointer to a newly called method is calculated by the processor core adding an offset value and a local variable size value to a pointer associated with the calling method.

6. A method of storing local variables, comprising:
   storing a first local variable set in a cache, the first local variable set associated with a first method and having a first pointer that identifies an initial variable in the first local variable set;
   storing the first pointer on top of the first local variable set when the first method calls a second method; and
   mapping a second local variable set associated with the second method adjacent the first pointer;
   wherein the first method calls the second method.

7. The method of claim 6 further comprising storing in the cache, adjacent to the first local variable set and first pointer, a second local variable set associated with the second method and having a second pointer that identifies an initial variable in the second local variable set.

8. The method of claim 7 wherein, upon finishing the second method, the first pointer is retrieved from the cache by subtracting an offset from the second pointer.

9. The method of claim 6 wherein storing the first pointer includes adding an offset and a local variable size to location pointed by the first pointer.

10. A cache subsystem, comprising:
a cache controller; and
cache memory coupled to said cache controller, said cache memory adapted to store a plurality of sets of local variables, each set being used by a separate method, wherein each of a plurality of sets of local variables is mapped adjacent a local variable pointer associated with a calling method.

11. The cache subsystem of claim 10 wherein said cache memory is adapted to store at least three sets of local variables, each set used by a different method and at least two of said sets mapped adjacent a local variable pointer associated with a calling method.

12. The cache subsystem of claim 10 wherein a pointer value is retrieved upon completion of a method by subtracting an offset from a pointer associated with the completed method.

13. A processor, comprising:
a processing core that generates memory addresses to access a memory and on which a plurality of methods operate;
a means for storing a plurality of local variable sets, each set associated with a method that runs on the core and each set having a base pointer, and for mapping a set of local variables associated with a called method adjacent a pointer value associated with the method that called the called method.

14. The processor of claim 13 wherein the means further comprise a means for subtracting an offset value from the pointer associated with the called method to compute a modified pointer value and for retrieving the value at a location pointed to by the modified pointer value.

15. The processor of claim 13 wherein the means further comprises a means for adding an offset value and a local variable size value to a pointer associated with the calling method.

* * * * *